United States Patent [19]

Hayashi et al.

[11] 4,282,064

[45] Aug. 4, 1981

[54] NUCLEAR FUEL ELEMENT

[75] Inventors: Kiyozumi Hayashi, Toride; Kazushige Domoto, Yokohama, both of Japan

[73] Assignee: Doryokuro Kakunenryo Kaihatsu Jigyodan, Tokyo, Japan

[21] Appl. No.: 42,512

[22] Filed: May 25, 1979

[30] Foreign Application Priority Data

May 24, 1978 [JP] Japan .................................. 53-62003

[51] Int. Cl.³ .............................................. G21C 3/30
[52] U.S. Cl. ....................................... 176/73; 176/78; 176/90
[58] Field of Search ....................... 176/73, 76, 78, 89, 176/90

[56] References Cited

U.S. PATENT DOCUMENTS

| 3,356,584 | 12/1967 | Ockert | 176/90 X |
|---|---|---|---|
| 3,378,454 | 4/1968 | Fiebelmann | 176/90 X |
| 3,386,887 | 6/1968 | Mogard | 176/90 X |
| 3,415,911 | 12/1968 | Lloyd | 176/90 X |
| 3,560,339 | 2/1971 | McHugh | 176/76 |
| 3,580,809 | 5/1971 | Williams et al. | 176/76 |
| 3,801,451 | 4/1974 | Scharf | 176/73 |
| 4,129,477 | 12/1978 | Johansson et al. | 176/73 |
| 4,131,511 | 12/1978 | Mordarski et al. | 176/78 X |
| 4,175,002 | 11/1979 | Wada | 176/73 X |

Primary Examiner—Peter A. Nelson
Attorney, Agent, or Firm—Wenderoth, Lind & Ponack

[57] ABSTRACT

A nuclear fuel element is provided which comprises a cladding tube having end plugs for sealing ends of the cladding tube and a multiplicity of fuel pellets stacked within the cladding tube. Each of the fuel pellets has a substantially cylindrical external lateral surface and a plurality of longitudinal recesses having rounded root portions on the external lateral surface, and has a height within the range from ½ to ⅓ of the outer diameter thereof. These fuel pellets with the floral petal shape are stacked in such a manner that the recesses of one pellet are not aligned with the recesses of adjacent upper and/or lower pellets.

5 Claims, 9 Drawing Figures

NUCLEAR FUEL ELEMENT

BACKGROUND OF THE INVENTION

The present invention relates generally to nuclear fuel elements comprising a cladding tube and a plurality of cylindrical fuel pellets stacked within the cladding tube. It relates, more particularly, to fuel elements in which stress at the inner surface of a cladding tube does not concentrate in a limited portion of the tube.

When a plurality of cylindrical fuel pellets are inserted and stacked in the cladding tube to form a nuclear fuel element, there is generally provided a gap of about 0.15 mm to 0.30 mm in the diameter between the cladding tube and the pellets disposed therein. The value of the clearance has been adjusted by grinding the outer surface of the pellets after they are sintered in the larger dimensional shape than nominal one, because the pellets are likely to form an hour-glass shape in which the upper and lower portions exhibit larger diameter than the middle portion.

When, however, the surface ground fuel element is exposed to the high temperature and radiation environments in a nuclear reactor, the fuel pellets exhibit a number of cracks therein due to a large temperature difference between the outer circumferential region and the central region of the pellets, with a result of forming a number of fragments of the pellets. FIG. 1 shows the thus cracked pellet 2 encapsuled in the cladding tube 1. The fragments produced by the cracks are located in a close abutment with the inner surface of the cladding tube. The fragments then produce a local stress on the cladding tube due to a thermal expansion and swelling etc, during the increase of the power output of the nuclear reactor. A further increase of the output urges the pellets to be deformed to form such a shape as schematically shown in FIG. 2, in which the cylindrical external lateral surface of the pellet is warped outwardly from the central exis of the pellet, especially for the both ends of the pellet. The outward warping is due to a small difference of fuel density in the longitudinal direction of the pellet and due to the temperature difference between the central and outer regions of the pellet. Thus, as shown in FIG. 3, stress at the inner surface of the cladding tube 1 facing to a crack opening 7 is largely developed in a limited section of the cladding tube to cause concentration of strain. If such strain concentration is caused, the cladding tube is broken at the strain-concentrated portion, even through the total strain caused in the circumferential direction of the cladding tube 1 is relatively small.

SUMMARY OF THE INVENTION

Accordingly, a principal object of the invention is to provide a fuel element which minimizes an undesired effect between a cladding tube and pellets.

Another object of the present invention is to provide a fuel element which minimizes a strain concentration at a limited section of the inner surface of a cladding tube.

According to the present invention, there is provided a nuclear fuel element comprising a cladding tube having end plugs for sealing ends of the cladding tube and a multiplicity of fuel pellets stacked within the cladding tube. Each of the fuel pellets has a substantially cylindrical external lateral surface and a plurality of longitudinal recesses having rounded root portions on the external lateral surface, and has a height within the range or from ½ to ⅓ of the maximum outer diameter of the cylindrical pellet. These fuel pellets are stacked in such a manner that the recesses of one pellet are not aligned with the recesses of adjacent upper and/or lower pellets.

In a preferred embodiment of the present invention, an aperture, or a through-hole, is provided in parallel with, and in eccentric to the central axis of the pellet. By providing such eccentric through-hole, it is possible to effectively stack a plurality of fuel pellets in the cladding tube such that the recesses of one fuel pellet are alternately in staggered relation with respect to the recesses of the adjacent fuel pellets.

Other objects and features of the present invention will be apparent from the description of the preferred embodiment of the invention, taken in conjunction with the accompanying drawings.

DETAILED DESCRIPTION OF THE INVENTION

Figure 4:
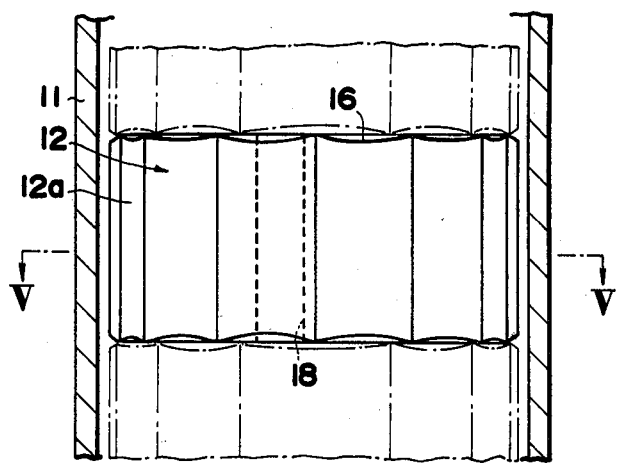
FIG. 4 is a side view illustrating a stack of fuel pellets in a fuel element of the present invention.
Figure 5:
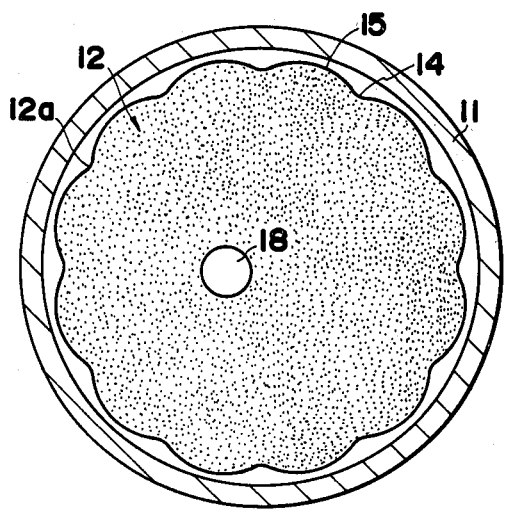
FIG. 5 is a sectioned view of the fuel element, taken along V—V of FIG. 4.

Referring to FIGS. 4 and 5, there is illustrated an preferred embodiment of a fuel element of the present invention, in which a plurality of fuel pellets 12 are disposed and stacked in a cladding tube 11. Each of the pellets 12 has a generally cylindrical external lateral surface 12a and a plurality of longitudinal recesses 14 uniformly spaced on the cylindrical external lateral surface such that these recesses are parallel with an axis of the cylindrical pellet. These recesses 14 are formed such that they have rounded root portions to form gentel waveform, or floral petal shape, on the external lateral surface 12a. The unrecessed round surface portions between the recesses 14 will hereinafter be referred to as convex portions illustrated at 15, for the purpose of clarification. The number of recesses is selected depending upon various factors such as density of heat generation, outer diameter of the pellet, etc, and it is generally preferred that about ten to fifteen recesses be provided in one pellet.

The pellet used in the present invention has a height which is sufficiently small relative to the diameter of the pellet. More specifically, the pellet has a height which falls within the range of from ½ to ⅓ of the diameter thereof. This configuration of the pellet provides improved uniform fuel density in the longitudinal direction of the pellet and less difference in the temperature expansion rates between the periphery of external lateral surface of the pellet and the central portion of the same. Thus, even in high temperature and radiation environments during the operation of reactor, the pellet is scarcely deformed into the hour-glass shape, and the upper and lower peripheral ends of external lateral surface of the pellet do not press the inner surface of the cladding tube.

Furthermore, the pellet may be chamfered at the ridge portions 16 between the convex surface 15 and the upper and lower end surfaces of the cylindrical pellet.

The pellet 12 described above may be produced by initially filling powdered fuel material in a molding die and then compressively molding the material, and followed by sintering. The thus produced pellet may be inserted into the cylindrical cladding tube 11 after a simple inspection by go or no-go gauge, without necessitating grinding of the external surface of the pellet.

It is known by Gittus theory (see Nuclear Engineering and Design; vol. 18, p. 69–82 (1972)) that a relationship between strain concentration factor α and the number of crack openings N produced in the pellet is given by the following formula:

$$\alpha = \pi\mu/mN$$

wherein $\mu$ represents friction coefficient between the pellet and the cladding tube, and m represents work-hardening coefficient.

Figure 6:
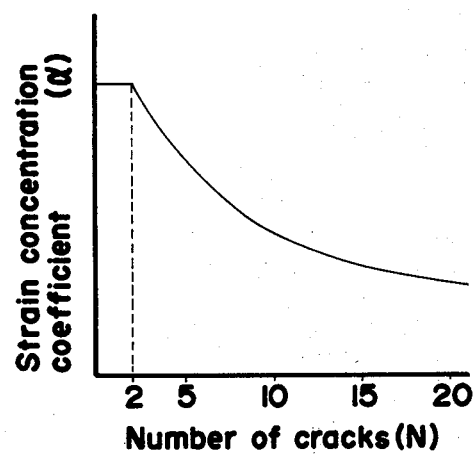
FIG. 6 is a graph generally showing the relationship between strain concentration factor $\alpha$ and the number of crack openings N produced in a pellet.

As is well illustrated in FIG. 6, there is a tendency that the strain concentration factor α decreases as the number of cracks N increases. It will be understood from FIG. 6 that the desirable number of cracks may be from about ten to fifteen enough to decrease the strain concentration factor. Since the cracks are generated at the recess portion 14 in the pellet, the number of recesses in the present invention may be preferably selected from ten to fifteen corresponding to the desirable number of cracks to be generated.

Figure 1:
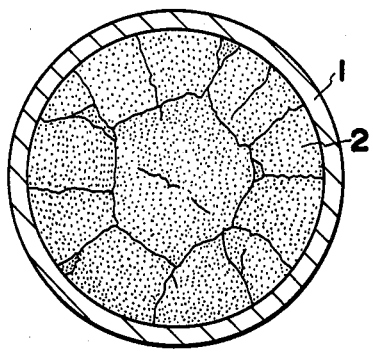
FIG. 1 is a sectioned view of a prior art nuclear fuel element, showing generation of cracks in a fuel pellet.
Figure 2:
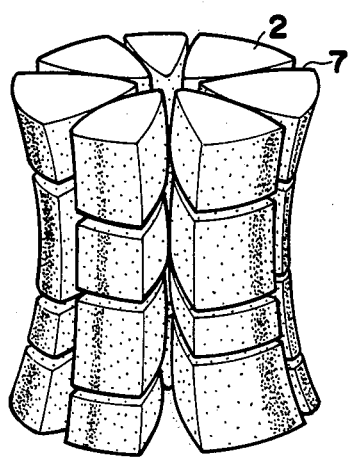
FIG. 2 is a schematic perspective view of a prior art deformed cylindrical fuel pellet.
Figure 3:
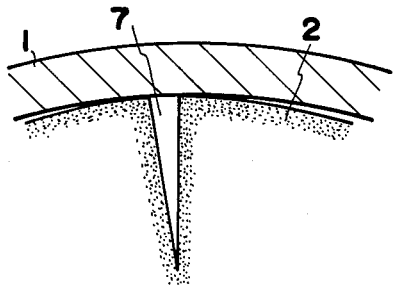
FIG. 3 is an enlarged sectional view showing a crack opening caused in a prior art long cylindrical fuel pellet.
Figure 7:
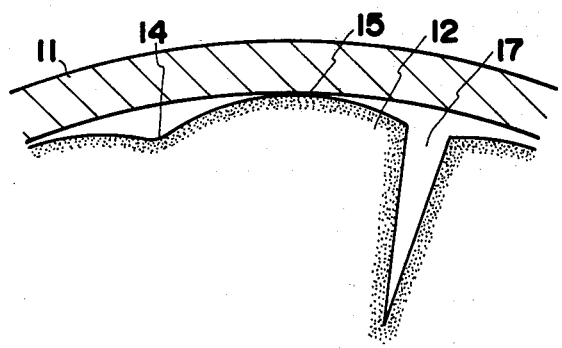
FIG. 7 is a sectioned view of a part of the fuel element of the invention, showing a crack produced at a recess of the pellet.

The floral petal shape fuel pellet as designed in the present invention may cause the generation of cracks 17 at the recesses 14 of the external lateral surface of the pellet, as illustrated in FIG. 7. Thus the convex portions 15 of the pellet contact smoothly with the inner surface of the cladding tube 11. The smooth contact portion is shifted along the inner surface of the cladding tube as the opening 17 of the crack is spread. Therefore, the cladding area which faces the crack opening 17 is free from the usual increase of local strain at the inner surface of the cladding tube 11. This is an important advantage not obtainable in the prior art fuel element as shown in FIG. 3. Namely, the convex portions 15 slidably contact with the inner surface of the cladding tube 11, and even when tensile hoop stress in the cladding tube exists, a strain developed in the cladding tube is substantially uniform and fairly very small, because of the larger distance between the adjacent convex portions 15.

In the embodiment hereinbefore described, the ridge portions 16 between the convex surface 15 and the upper and lower end surfaces of the cylindrical pellet 12 are chamfered. This configuration is advantageous to prevent the drop-off or formation of fragments or minute fuel solids and to decrease the undesirable effect of the upper and lower peripheral ends of the pellet on the inner surface of the cladding tube 11.

Since the pellet is formed such that its height is rather small and falls within the range of from ½ to ⅓ of the diameter thereof, a radial growth which is likely to develop at the upper and lower portions of the prior art pellet to form an hour-glass shaped pellet does not occur during the reactor operation. Therefore, it is not necessary, in the pellet of the present invention, to grind the external surface of the pellet so as to adjust the gap between the external surface of the pellet and the inner surface of the cladding tube. Thus, a loss of the nuclear materials may be minimized, particularly for plutonium fuel pellets containing a mixture of plutonium dioxide and uranium dioxide ($PuO_2+nUO_2$) which require a severe protection of radiation and a difficult recovery process for used and scrapped materials. Such minimum loss of the nuclear materials may be provided also for pellets of other materials such as uranium dioxide or a mixture of uranium dioxide and thorium dioxide ($UO_2+ThO_2$). Without grinding process for pellets, it greatly contributes to the cost reduction of the fuel fabrication.

Figure 8:
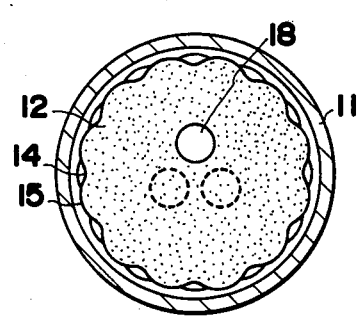
FIG. 8 is a sectioned view of a fuel element of the invention, showing fuel pellets having recesses are stacked such that recesses and a through-hole in one pellet is in staggered relationship with respect to the recesses and the through-hole of the adjacent pellets.
Figure 9:
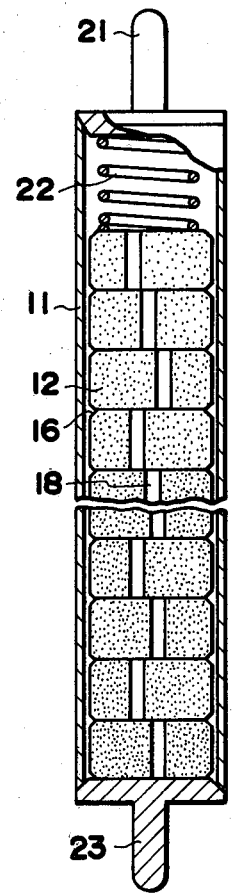
FIG. 9 is a sectioned view of a nuclear fuel element of the invention containing fuel pellets which are stacked in a prescribed manner.

It is preferred that each of the fuel pellets has an eccentric through-hole 18 provided in parallel with, and in adjacent to the axis of the pellet, as shown in FIGS. 4 and 5. According to the present invention the pellets are stacked in such a manner that the recesses 14 of one pellet do not meet with or aligned with the recesses of closely adjacent upper and/or lower pellets. In other words, the pellets are radially turned slightly such that the recesses in one pellet are not in alignment with the recesses of the adjacent pellets as well shown in FIG. 8. This will be accomplished by, for example, passing a wire or a rod through the through-holes 18 of the pellets to form a string of pellets, placing the string of pellets on a tray, and inserting the pellets on the tray one by one into a rotating cladding tube successively. The thus formed fuel element is illustrated in FIG. 9, in which the fuel pellets are stacked in the cladding tube 11 such that the through-hole 18 of one pellet 12 is not aligned with the through-holes of adjacent upper and/or lower pellets. The fuel element has end plugs 21, 23 which seal the upper and lower ends of the cladding tube 11 to complete a leak-tight enclosure for the fuel pellets. The stacked pellets are held in position within the cladding tube 11 by means of a spring 22.

In the fuel element of the present invention, the recesses of one pellet do not meet with the recesses of the adjacent ones and do not provide a longitudinally continuous space having a larger gap between the pellet and the cladding tube. Therefore, it provides a remarkable advantage that it prevents a reduction of heat transfer characteristics at a limited region with larger gap between pellet and the cladding tube, and the heat transfer of the gap between the pellet and the cladding tube can be estimated by an average value of the gap therebetween.

The structure of the fuel element, in which the eccentric through-hole of one pellet do not meet with the through-holes of other adjacent pellets, provides an advantage that fragment and minute fuel solids due to cracks or the like can be maintained at a certain place in the element and prevents these materials and fragments from being accumulated at the lowest end of the element.

Provision of the eccentric through-hole 18 in the pellet is preferred especially for a pellet having a high hurn-up degree, because the through-hole also has a function to give the free volume for the fission gas release and to give the space for swelling of the pellet.

It has thus been shown that, according to the present invention, even when a desirable mutual interaction occurs between the pellet and the inner surface of the cladding tube during operation of reactor, the external lateral surface of the pellet slidably contacts with the inner surface of the cladding tube at the convex portions between the recesses provided on the external lateral surface of the pellet. Thus, the strain concentration in the cladding tube decreases effectively, and the rupture or bursting of the cladding tube is prevented. In addition, by stacking fuel pellets in the cladding tube such that the recesses in one fuel pellet is alternately in staggered relationship with respect to the recesses of the adjacent fuel pellets, it is possible to calculate the heat transfer by an averaged value of the gap between pellets and the cladding tube.

While the invention has been described with respect to a preferred embodiment, it should be apparent to those skilled in the art that numerous modifications may be made thereto without departing from the spirit and scope of the invention.

What is claimed is:

1. A nuclear fuel element comprising:
   a cladding tube having end plugs for sealing the ends of said tube; and
   a multiplicity of fuel pellets stacked within the cladding tube;
   each of said fuel pellets having a substantially cylindrical external lateral surface and a plurality of longitudinal recesses having rounded root portions on the external lateral surface, a height of each pellet ranging from $\frac{1}{2}$ to $\frac{1}{3}$ of the outer diameter thereof,
   the fuel pellets being stacked in such a manner that the recesses of one pellet are not aligned with the recesses of adjacent upper and/or lower pellets.

2. The nuclear fuel element according to claim 1, wherein the fuel pellet has a through-hole which is in parallel with, and in eccentric to the central axis of the pellet.

3. The nuclear fuel element according to claim 2, wherein the fuel pellets are stacked such that the eccentric through-hole of one pellet is not aligned with the through-holes of other adjacent pellets.

4. The nuclear fuel element according to claim 1, wherein the fuel pellet has chamfered ridge portions.

5. The nuclear fuel element according to claim 1, wherein about ten to fifteen recesses are provided on the external lateral surface of the pellet.

* * * * *